United States Patent
Lindroos et al.

(10) Patent No.: US 6,495,024 B1
(45) Date of Patent: Dec. 17, 2002

(54) METHOD FOR THE REMOVAL OF ARSENIC FROM SULFURIC ACID SOLUTION

(75) Inventors: Leo Lindroos, Pori (FI); Henri Virtanen, Pori (FI)

(73) Assignee: Cutokumpo OYJ (FI)

( * ) Notice: Subject to any disclaimer, the term of this patent is extended or adjusted under 35 U.S.C. 154(b) by 59 days.

(21) Appl. No.: 09/723,524

(22) Filed: Nov. 28, 2000

(30) Foreign Application Priority Data

Dec. 21, 1999 (FI) .............................................. 19992738

(51) Int. Cl.$^7$ ............................................... C22B 30/00
(52) U.S. Cl. ....................... 205/583; 205/584; 205/99; 423/531; 423/87
(58) Field of Search .................................. 205/583, 584, 205/99; 423/531, 87

(56) References Cited

U.S. PATENT DOCUMENTS

| | | | | |
|---|---|---|---|---|
| 4,701,311 A | * | 10/1987 | Baradel et al. | ................ 423/87 |
| 5,039,496 A | * | 8/1991 | Kehl et al. | ..................... 423/24 |
| 5,449,503 A | * | 9/1995 | Redmon et al. | ............... 423/87 |

* cited by examiner

*Primary Examiner*—Arun S. Phasge
(74) *Attorney, Agent, or Firm*—Morgan & Finnegan LLP

(57) ABSTRACT

The object of this invention is a method by which arsenic is removed from sulfuric acid solution, in which the sulfuric add concentration is at least 300 g/l, at a temperature of 50–105° C. by reducing the arsenic in the solution with the aid of sulfur dioxide. The arsenic trioxide produced is crystallized from the sulfuric acid solution by cooling. The method is particularly suitable for use in connection with the electrolytic refining of metals, as in copper refining.

6 Claims, 2 Drawing Sheets

METHOD FOR THE REMOVAL OF ARSENIC FROM SULFURIC ACID SOLUTION

The object of this invention is a method by which arsenic is removed from sulfuric acid solution, of which the sulfuric acid content is at least 300 g/l at a temperature of 50–105° C., by reducing the arsenic of the solution with the aid of sulfur dioxide. The method is particularly suitable to be used together with electrolytic refining of metals, such as in copper refining.

In principle, the impurities present in electrolytically leaching of anode copper behave in two different ways: impurities more basic than copper dissolve and the more noble remain undissolved, whereupon they form so-called anode slime. In both cases there is a possibility as a result that the impurities precipitate onto the cathodes and thus cause contamination in cathode quality.

Arsenic occurs in the anode together with other elements as various compounds, of which the electrochemical potentials differ from each other, whereupon part dissolves in the electrolyte and part falls into the anode slime. The composition of the anodes and electrolysis conditions affect the distribution of these impurities between the electrolyte and anode slime.

Arsenic dissolves into the electrolyte as trivalent ion. As a result of different oxidation reactions, arsenic occurs, however, as pentavalent in the electrolyte. If soluble arsenic is not removed from the electrolyte, it gradually accumulates in the electrolyte. It is not, however, absolutely necessary to completely remove arsenic from the solution: it is sufficient to keep its content below a certain level.

The modern processes for the removal of arsenic in use in copper electrolysis are based, for the most part, on the electrolytic reduction of arsenic in so-called decopperizing electrolysis or on the utilization of extraction technology.

Decopperizing electrolysis technology is generally incorporated with nickel removal from the electrolyte. When nickel is removed from the electrolyte, copper is first removed with the aid of decopperizing electrolysis using insoluble lead anodes. In connection with decopperizing electrolysis it is at the same time possible to remove arsenic as copper arsenide at the final stage of the process, as the copper content of the solution is reduced sufficiently low. From the copper-free solution, nickel is obtained by concentrating the solution. The process has the advantage of being old, well-known technology. The disadvantages of the process are especially when it is used for the removal of arsenic, the possibility of forming of toxic arsine gas in the final stage of the process and the disposal of the copper arsenide deposits formed as the end product of the process. When arsenic is removed by this process, copper must also always be removed.

In the art it is known a method where the decopperizing process is based on the use of periodic reversal current technology (PRC) connected with a large solution flow rate and an elevated temperature in the last stage of decopperizing electrolysis. It is thus possible to remove arsenic efficiently without the formation of arsine gas. The process is, however, furnished with an expansive air conditioning and analyzing system in order to ensure the detection and removal of any possible arsine produced. It is possible to remove approximately 80% of the arsenic fed into the last stage of the decopperizing process and the precipitate obtained is copper arsenide.

In Japanese patent application 59-074245 it is described a method where the arsenic of the electrolyte is also removed in decopperizing electrolysis, whereby copper arsenide precipitate is obtained. The copper arsenide precipitate obtained is leached by the aid of oxygen and sulfuric acid and the copper sulfate produced is crystallized and removed from the solution. By cooling the solution, lead sulfate is removed, after which bismuth is removed. Finally the arsenic of the solution is reduced by sulfur dioxide and the arsenic can be precipitated as arsenic trioxide.

The arsenic extraction processes of the electrolyte operating on the commercial scale are based on the use of tributyl phosphate as the extraction agent. In the extraction process arsenic can be obtained as a diluted arsenic acid-sulfuric acid solution, out of which arsenic is to be precipitated. The problem with the process is that the antimony and bismuth contained in the electrolyte precipitate at the extraction stage, and the precipitation produced thereby disturbs the process. The extraction agent may also cause problems in the growth of the cathode in the actual copper electrolysis process.

The best-known electrolyte extraction process is the MHO extraction process, where undiluted tributyl phosphate is used as the extraction agent. Before extraction, copper is removed from the electrolyte while the acid content and at the same time the arsenic content are increased in decopperizing electrolysis and in evaporation. The extraction of arsenic takes place in a separate extraction unit, which simultaneously acts as the concentrator for the removal of antimony-bismuth-arsenic deposition from the process. The subsequent solution after extraction is taken to nickel crystallization. Arsenic is precipitated from the stripping solution as arsenic trioxide, which requires the reduction of arsenic from pentavalent to trivalent.

It is also known in the art another extraction process, which is also based on the use of tributyl phosphate as the extraction reagent. In that case tributyl phosphate is used 50% diluted in Shellsol 2046. The solution for the process is taken from the decopperizing electrolyte, whereby the copper content of the solution has been reduced to a value of about 30 g/l. Then it has also been possible to raise the acid content of the solution. The extraction is based on conventional mixer-settler technology. The arsenic-containing stripping solution obtained is neutralized and the arsenic present is precipitated as copper arsenate. The copper arsenate is sold for the manufacture of wood impregnation material.

According to the method of this invention, the problems laid out in the previous method are overcome. Arsenic can be removed simply and selectively from the electrolyte of a copper electrolysis, from which most of the copper has first been removed. Arsenic is reduced in a concentrated sulfuric acid solution and the only reagent used in the method is sulfur dioxide gas, which reacts to sulfuric acid in the process, which for its part has no harmful effects on the electrolysis plant. Arsenic trioxide obtained is crystallized from the solution by cooling and the resulting product is so pure that it can be used directly, for example in the manufacture of wood impregnation material. The essential features of the present invention are set out in the claims attached.

BRIEF DESCRIPTION OF DRAWINGS

The present invention is described also with the aid of the enclosed figures, whereby.

Figure 1:
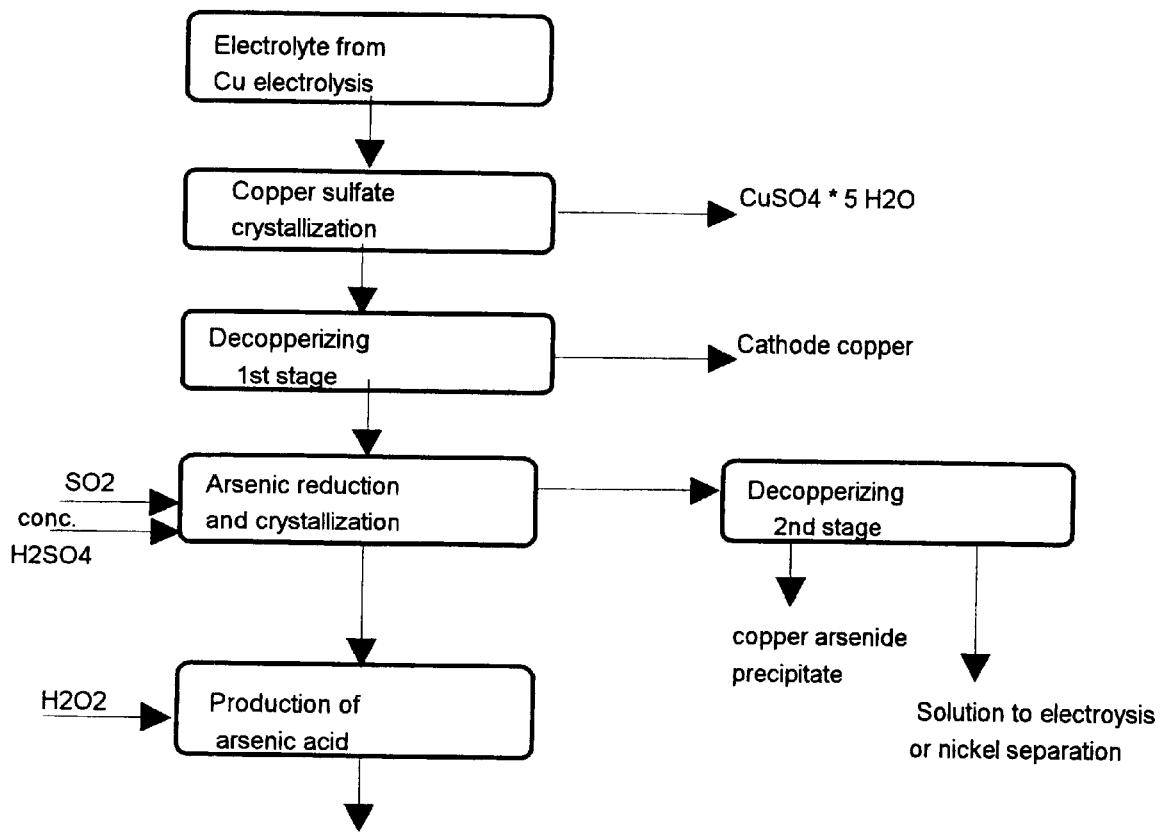
FIG. 1 is a flowsheet of the implementation of the method according to example 1.
Figure 2:
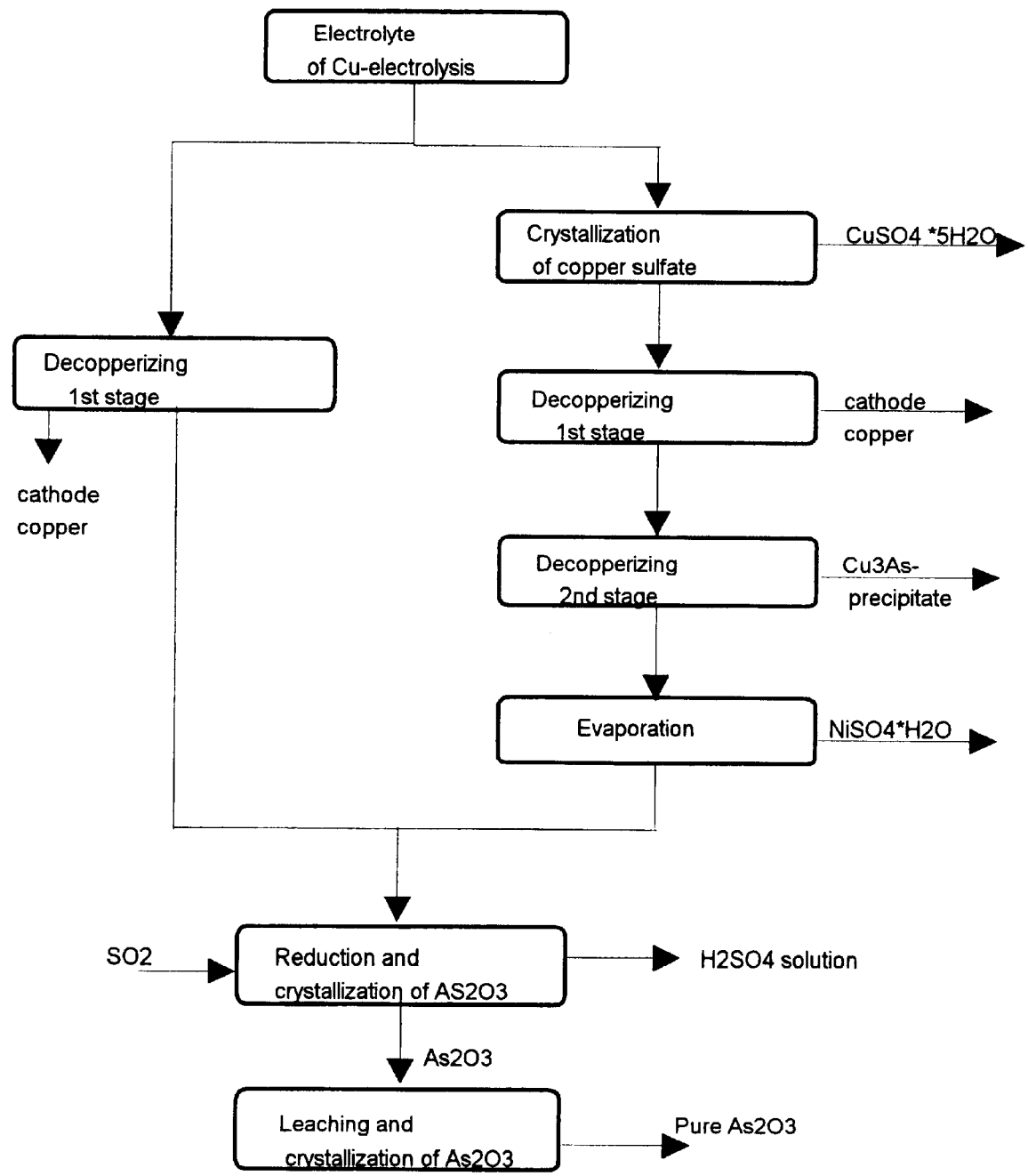
FIG. 2 is the flowsheet of the implementation of the method according to example 2.

We have now ascertained that arsenic can be reduced from a concentrated electrolyte at a temperature of 50–105° C.

under normal pressure with the aid of sulfur dioxide. The use of known catalysts can accelerate the reduction reaction. When the reduction is carried out in an airtight reactor, it is enough to use an equivalent amount of sulfur dioxide in relation to arsenic in reduction. The advantage of an airtight reactor is, that $SO_2$-containing gases do not escape from the reactor, neither is any apparatus required for their purification. The sulfuric acid content of the concentrated electrolyte can be as high as 700 g/l, when the reduction is done under normal pressure. The reaction taking place in reduction is as follows:

$$2H_3AsO_4 + 2SO_2 \rightarrow As_2O_3 + 2H_2SO_4 + H_2O$$

In the same way it has been observed, that the solubility of the arsenic trioxide into the electrolyte, of which the acid content is over 300 g/l, at a temperature of 30° C. at the highest, is sufficiently low. When the reduced electrolyte is cooled slowly to the above-mentioned temperature while the solution is being stirred at the same time, arsenic crystals are obtained, which are easy to separate from the mother solution.

In the arsenic removal according to this method, the copper content of the solution must be sufficiently low so that the copper sulfate does not yet crystallize as the solution is being cooled. It is not necessary to remove all the copper, however: an amount of up to 25-g/l copper can remain, although preferably from 8–15 g/l. This copper content is achieved by decopperizing electrolysis, where only copper is precipitated onto the cathodes. Before decopperizing electrolysis, copper in the solution is removed by evaporation crystallization, thus also concentrating the solution in relation to sulfuric acid content.

If nickel is to be removed from the electrolyte of the electrolysis, it is possible to remove the copper of the solution produced in arsenic precipitation in further decopperizing electrolysis and after this to precipitate nickel from the solution, for example by concentrating the solution by evaporation. If the need for nickel removal in the electrolysis plant is small, it is possible to return the electrolyte partly to the electrolysis after reduction and crystallization of arsenic.

The method according to this invention can also be utilized in such a way that solution purification of the electrolysis plant is done first using conventional decopperizing and evaporation technology. In this case the arsenic concentrates in concentrated sulfuric acid. The concentrated sulfuric acid is diluted by the electrolyte, or by such an electrolyte from which part of the copper has been removed by crystallization or in decopperizing electrolysis. Impure condensate produced in the electrolysis plant can also be used in dilution. When the sulfuric acid content of the solution is from 300–700 g/l, arsenic is removed in the manner as presented above.

By the method according to the present invention, arsenic acid can be produced from the precipitated arsenic trioxide in a simple way. In that case the arsenic trioxide is slurried in water and heated preferably to a temperature of about 80° C. At this temperature the arsenic trioxide dissolves and is oxidized into arsenic acid using hydrogen peroxide. Other known technology can also be used in the production of arsenic acid.

If it is desired to purify the arsenic trioxide of the small amount of impurities therein contained, purification can be done by recrystallization. Then the arsenic trioxide is e.g. dissolved in hot water, the residue is filtered off, the solution is cooled and the pure arsenic trioxide crystallizes. The mother solution can be re-used for purification of the arsenic trioxide solution.

The present invention is described further with the aid of the examples herewith.

EXAMPLE 1

The initial batch was 157 l of copper electrolysis electrolyte, of which the analysis was as follows: Cu 55 g/l, As 11 g/l, Sb 0.1 g/l, Bi 0.05 g/l and $H_2SO_4$ 170 g/l. In the two-stage vacuum evaporation the solution was concentrated and 25.4 kg of copper sulfate pentahydrate ($CuSO_4*5 H_2O$) was removed. The volume of mother solution was 60 l and the analysis was following: Cu 40 g/l, As 28.1 g/l, Ni 38.5 g/l and $H_2SO_4$ 440 g/l. The copper content of the solution was decreased in decopperizing electrolysis using insoluble anodes. Thus the volume of solution treated was 59.5 l, of which the analysis was: Cu 9 g/l, As 28.4 g/l, Ni 38.5 g/l and $H_2SO_4$ 492 g/l.

The solution batch was heated by indirect steam heating and reduced with the aid of sulfur dioxide in a reactor equipped with a mixer at a temperature of 80° C. The reactor was totally airtight, but not under pressure. 1.52 kg $SO_2$ gas was used and the reduction time was 15 h. At the end of reduction an additional 3-kg of 93% sulfuric acid was added into the reactor.

The batch was cooled initially by changing the air in the gas space of the reactor. The final cooling was carried out with cold water using the cooling piping in the reactor. The solution batch was cooled to a temperature of 27° C., which was maintained for a period of six hours. The arsenic trioxide precipitated was easy to infiltrate. The moisture content of the crystals was kept at 25% in order to prevent dusting of the precipitate. 1.83 kg (dry weight) arsenic was obtained, of which the analysis is as follows: As 74%, Sb 0.6% and Bi 0.1%. The volume of filtrate was 56 l and its analysis as follows: Cu 9.6 g/l, As 6 g/l, Ni 40.9 g/l and $H_2SO_4$ 614 g/l. Finally copper was removed from the solution in copper electrolysis and the nickel was removed using evaporation technology.

The 1.83 kg batch of arsenic trioxide obtained was slurried in a small amount of water and the slurry was heated to 80° C. At this temperature the arsenic trioxide was oxidized to arsenic acid with the aid of 50% hydrogen peroxide, of which 1.3 kg was required. 1.56 kg arsenic acid was obtained and its analysis was following: As (V) 869 g/l, Sb 6.8 g/l and Bi <20 mg/l.

EXAMPLE 2

The initial batch was 154 l of copper electrolysis electrolyte, the analysis of which was as follows: Cu 55 g/l, As 14 g/l, Sb 0.5 g/l, Bi 0.15 g/l, Ni 15 g/l and $H_2SO_4$ 170 g/l. 35.8 l of this solution was treated in the electrolytic decopperizing. As a result of the treatment 35.4 l of solution were obtained, of which the analysis was as follows: Cu 15 g/l, As 14.1 g/l, Ni 15.2 g/l and $H_2SO_4$ 230 g/l. This solution was taken for arsenic precipitation. 118 l of initial solution batch was taken for vacuum evaporation-crystallization and from this copper sulfate pentahydrate was removed. After crystallization, the volume of solution was 57.4 l and its analysis was the following: Cu 40 g/l, As 28.7 g/l, Ni 30.6 g/l and $H_2SO_4$ 405 g/l. Two-stage decopperizing electrolysis was carried out on the solution. 56.1 l of solution was obtained, of which the analysis was: Cu 0.5 g/l, As 23.8 g/l, Ni 31.4 g/l and $H_2SO_4$ 405 g/l. The solution was further concentrated by evaporation at a temperature of 150° C. and the precipitated nickel sulfate salt was removed. 20.6 l of concentrated solution were obtained, the analysis of this was: Cu 0.2 g/l, As 64.0 g/l, Ni 4.0 g/l and $H_2SO_4$ 1090 g/l.

The above-mentioned amount of 35.4 liters of solution and the last obtained 20.6 l of solution were combined, whereby 55.8 l solution was obtained, of which the analysis was the following: Cu 9.6 g/l, As 32.8 g/l, Ni 11.2 g/l and $H_2SO_4$ 551 g/l. Potassium iodide was added to the solution as a catalyst.

The solution the initial batch was heated by direct steam heating to a temperature of 100° C. After this the batch was reduced in a reactor equipped with a mixer by the aid of sulfur dioxide gas at a temperature of 98–102° C. The reactor was totally airtight, but not, however, under pressure. 1.75 kg $SO_2$ gas was used over a period of 18 h of reduction. A further 2.1 kg of 93-% sulfuric acid was added into the reactor at the end of reduction.

At the end of the reduction stage it was ascertained that a small amount of sulfur dioxide gas still remained in the solution. An amount of untreated solution was fed into the solution. After this treatment there was no longer any additional sulfur dioxide gas. The solution was cooled to a temperature of 25° C. steadily over a period of 6 hours and this temperature was maintained for 8 hours.

The arsenic trioxide that precipitated was separated from the solution by suction filtration. The arsenic trioxide was easy to filtrate. 2.06 kg (dry weight) arsenic trioxide was obtained and the analysis was as follows: As 73.2%, Sb 2.0%, Bi 0.2%, Cu<0.01% and Ni 0.01%. The moisture content of the precipitate was 24%. The volume of filtrate was 61 l, including the wash water. The As content of the solution was 5.3 g/l.

The precipitate was dissolved at a temperature of 100° C. in a volume of 19 l pure water, and the dissolution time was 15 h. The insoluble precipitate was separated from the solution, the amount of the precipitate being 90 g. The clear solution was cooled slowly and kept at a temperature of 20° C. for 10 h. The arsenic trioxide precipitate was separated by suction filtration and was noticed to be well filtratable. 1.09 kg (dry weight) purified arsenic trioxide were obtained. The analysis of the precipitate was the following: As 75%, Sb 0.2%, Bi 0.04%, Cu<0.02% and Ni 0.02%. The filtrate obtained was used in the leaching of the new unpurified arsenic trioxide batch.

EXAMPLE 3

15 $m^3$ of 70-% sulfuric acid obtained from vacuum evaporation, 6 $m^3$ copper tankhouse electrolyte and 11 $m^3$ impure condensate were taken as the initial batch. Thus a solution batch was obtained where the copper content was 11 g/l, the sulfuric acid content 550 g/l and the pentavalent arsenic content 24 g/l.

50 g potassium iodide was added to the batch solution as the catalyst and the batch was heated to a temperature of 80° C. The amount of sulfur dioxide gas required was calculated (670 kg/batch), after which the sulfur dioxide feed was begun at a rate of 150 kg/h.

A specially designed gas-tight reactor was used as the reduction reactor for the purpose of the arsenic reduction. The mixer in the reactor was a two-bladed mixer, in which the blades of the lower part of the shaft were normally slanted blades and those of the upper part, gas-sucking. Thus, with the aid of the upper mixer blades it was possible to suck the $SO_2$ gas, which had separated from the liquid, back into the liquid.

After the $SO_2$ gas feed a further 1 $m^3$ of vacuum evaporator acid was added into the reactor. This was to confirm that no extra unreacted sulfur dioxide remained in the batch. At the same it was possible to further increase the sulfuric acid content of the batch slightly.

The reduced batch was transferred to a separate precipitation reactor, where the temperature of the batch was lowered to 20° C. The crystallized arsenic trioxide was left to settle for 24 hours, after which the clear surface solution was decanted and transferred to copper electrolysis as additional acid. The solution contained 5.4 g/l trivalent arsenic and 592 g/l sulfuric acid.

The arsenic trioxide remaining in the reactor was washed and filtrated by belt filter. The filtrated arsenic trioxide was slurried in water. The oxidization of the arsenic trioxide into arsenic acid was carried out with hydrogen peroxide at a temperature of 80° C. The arsenic acid produced was used in the manufacture of wood impregnation material.

What is claimed is:

1. A method for the removal of arsenic from a sulfuric acid solution containing copper, arsenic, antimony and bismuth, comprising first removing most of the copper from the sulfuric acid solution by crystallization and with decopperized electrolysis, leaving a concentrated sulfuric acid solution, the copper content of the concentrated sulfuric acid solution being at most 25 g/l; reducing the arsenic under atmospheric conditions, with the aid of sulfur dioxide at a temperature of 50–105° C., from concentrated sulfuric acid solution, in which the concentration is at least 300 g $H_2SO_4$/l, producing arsenic trioxide; crystallizing the arsenic trioxide produced from the sulfuric acid solution by cooling the solution to a temperature of 30° C. at the highest, and separating the crystallized arsenic trioxide from the solution as an arsenic trioxide precipitate.

2. A method according to claim 1, wherein the copper content of the concentrated $H_2SO_4$ solution is 8–15 g/l.

3. A method according to claim 1, wherein the arsenic is reduced from sulfuric acid solution with a concentration of 300–700 g/l.

4. A method according to claim 1, wherein the arsenic trioxide precipitate produced is slurried in water and oxidized into arsenic acid.

5. A method according to claim 1, wherein the arsenic trioxide precipitate produced is dissolved in water at an elevated temperature forming an antimony-bismuth precipitate, the antimony-bismuth precipitate formed is separated and the pure arsenic trioxide is crystallized from the solution by cooling.

6. A method according to claim 1, wherein the arsenic is reduced from the sulfuric acid solution with the aid of sulfur dioxide at normal pressure in an airtight reactor, which is equipped with a two-blade mixer, of which the lower blades are slanted and the upper blades are gas-sucking.

* * * * *

UNITED STATES PATENT AND TRADEMARK OFFICE
CERTIFICATE OF CORRECTION

PATENT NO.    : 6,495,024 B1
DATED         : December 17, 2002
INVENTOR(S)   : Leo Lindroos et al.

It is certified that error appears in the above-identified patent and that said Letters Patent is hereby corrected as shown below:

Title Page,
Item [73], Assignee: "Cutokumpu OYJ (FI)" should read -- Outokumpu Oyj --.

Signed and Sealed this

Eleventh Day of March, 2003

JAMES E. ROGAN
*Director of the United States Patent and Trademark Office*